(No Model.)  4 Sheets—Sheet 1.

W. H. ECKERT & J. A. SEELY.
POLICE TELEPHONE SYSTEM.

No. 365,911.  Patented July 5, 1887.

WITNESSES:

INVENTORS
William H. Eckert
John A. Seely
BY

ATTORNEY (No Model.) 4 Sheets—Sheet 2.

W. H. ECKERT & J. A. SEELY.
POLICE TELEPHONE SYSTEM.

No. 365,911. Patented July 5, 1887.

WITNESSES:
Raymond Barnes
C. E. Trump

INVENTORS
William H. Eckert
John A. Seely
BY
W. J. Johnston
ATTORNEY (No Model.) 4 Sheets—Sheet 3.
W. H. ECKERT & J. A. SEELY.
POLICE TELEPHONE SYSTEM.
No. 365,911. Patented July 5, 1887.
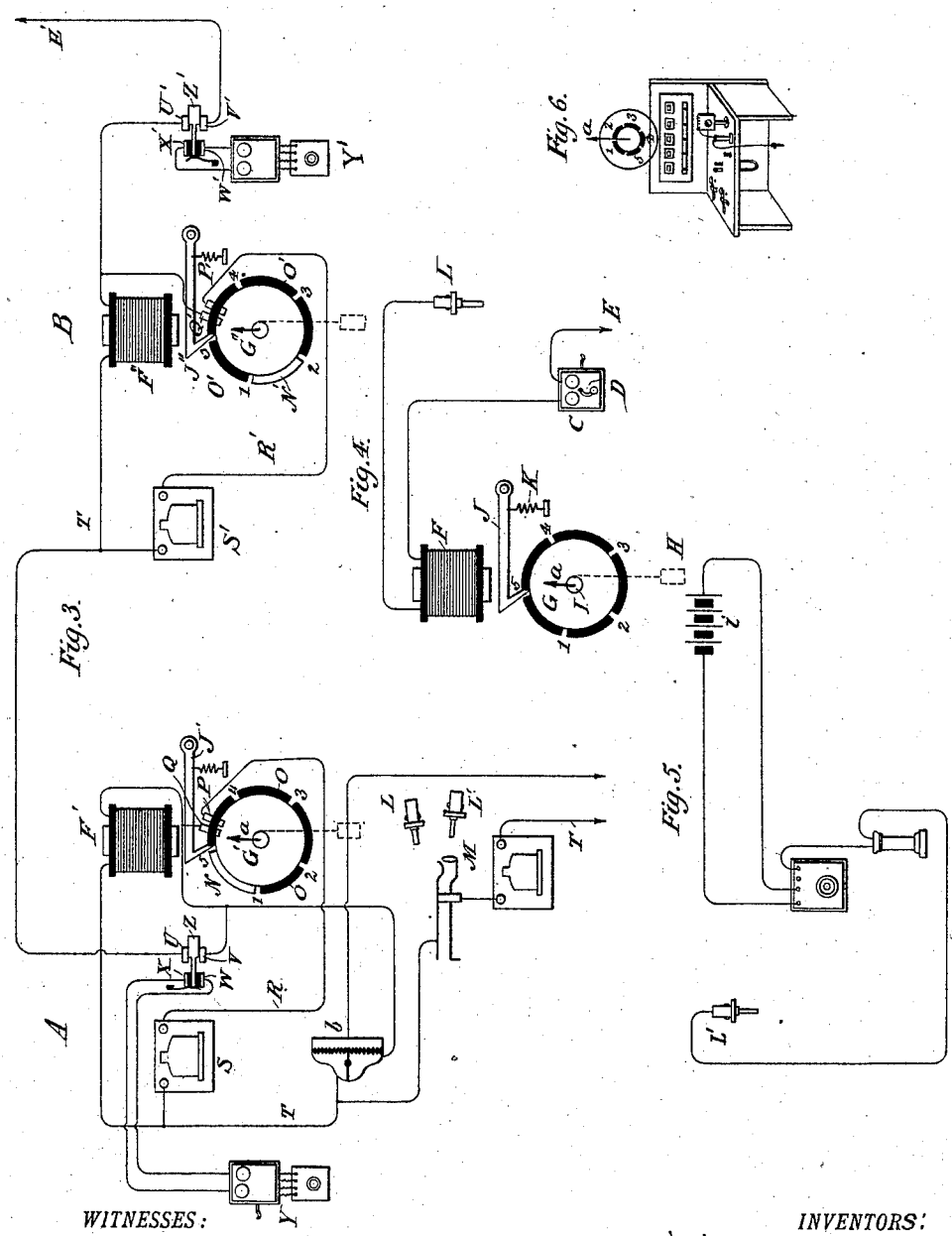
WITNESSES:
INVENTORS:
William H. Eckert
John A. Seely
BY
ATTORNEY (No Model.) 4 Sheets—Sheet 4.
W. H. ECKERT & J. A. SEELY.
POLICE TELEPHONE SYSTEM.
No. 365,911. Patented July 5, 1887.
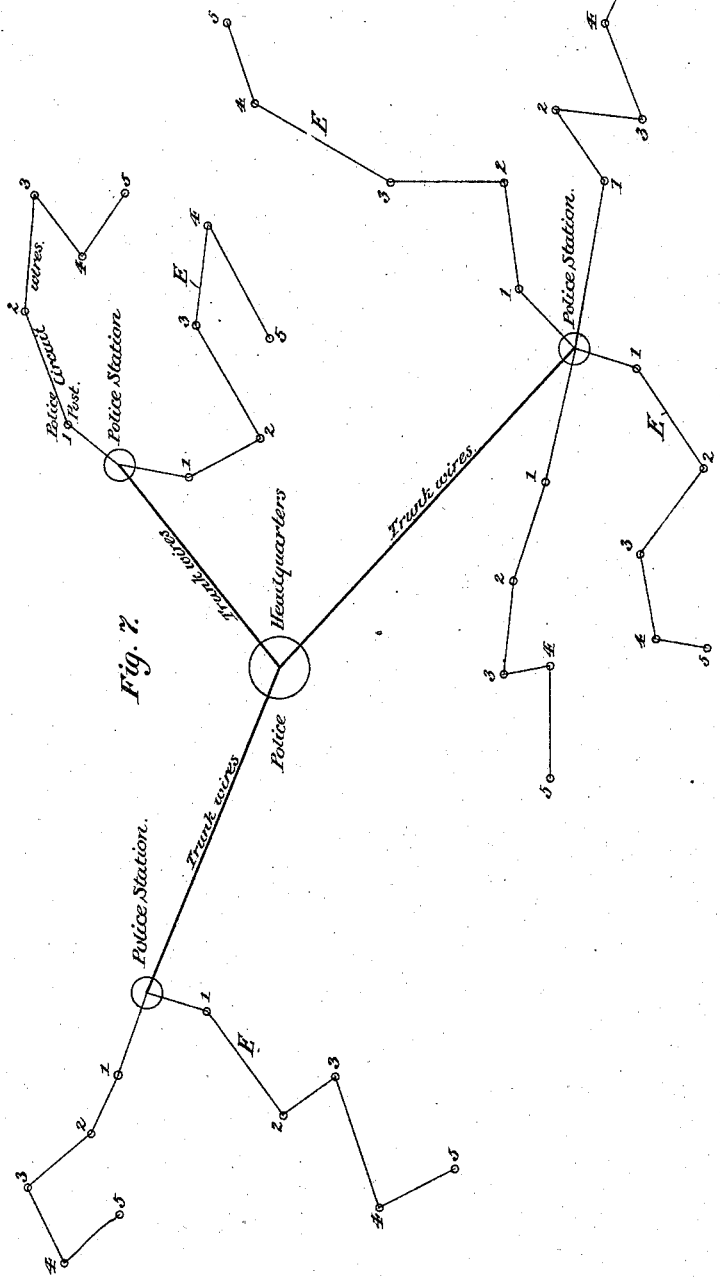
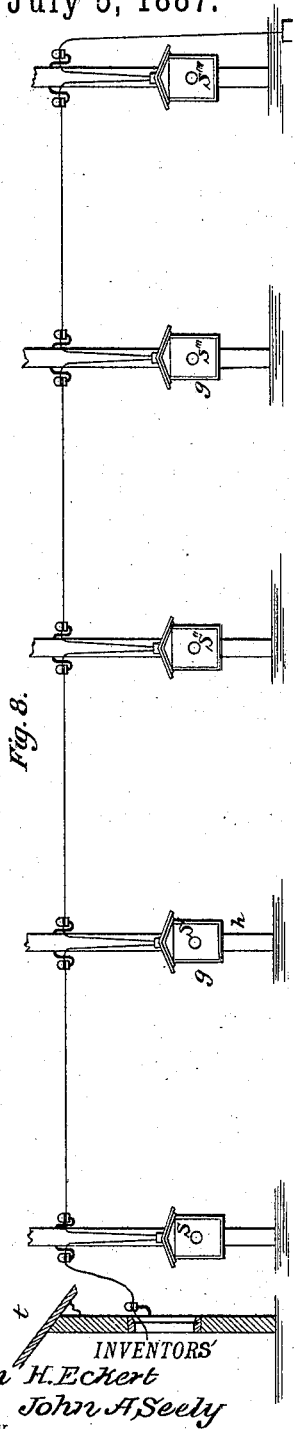
WITNESSES:
INVENTORS'
William H. Eckert
John A. Seely
BY
ATTORNEY
N. PETERS, Photo-Lithographer, Washington, D. C.

UNITED STATES PATENT OFFICE.

WILLIAM H. ECKERT AND JOHN A. SEELY, OF NEW YORK, N. Y.

POLICE-TELEPHONE SYSTEM.

SPECIFICATION forming part of Letters Patent No. 365,911, dated July 5, 1887.

Application filed August 28, 1886. Serial No. 212,060. (No model.)

*To all whom it may concern:*

Be it known that we, WILLIAM H. ECKERT, and JOHN A. SEELY, citizens of the United States, and residents of New York, in the county of New York and State of New York, have invented certain new and useful Improvements in Police-Telephone Systems, of which the following is a complete, clear, and exact description, setting forth in general and in detail our invention.

Our invention relates to a system whereby policemen throughout a city may be communicated with telephonically.

The object is to provide a system composed of elements which are simple of construction and not liable to get out of order. The system is composed of a central station termed the "police-headquarters," sub-stations termed "police-stations," and sub-stations termed "posts" or "policemen's boxes." The first two kinds of stations are telephonically connected in the usual manner. The latter two are connected and adapted to operate in the manner as more fully hereinafter described.

In order to illustrate the practical manner of carrying out the invention, drawings are hereunto annexed and described, in which similar letters of reference represent corresponding elements, and in which each part referred to is designated by a single letter.

Figure 1:
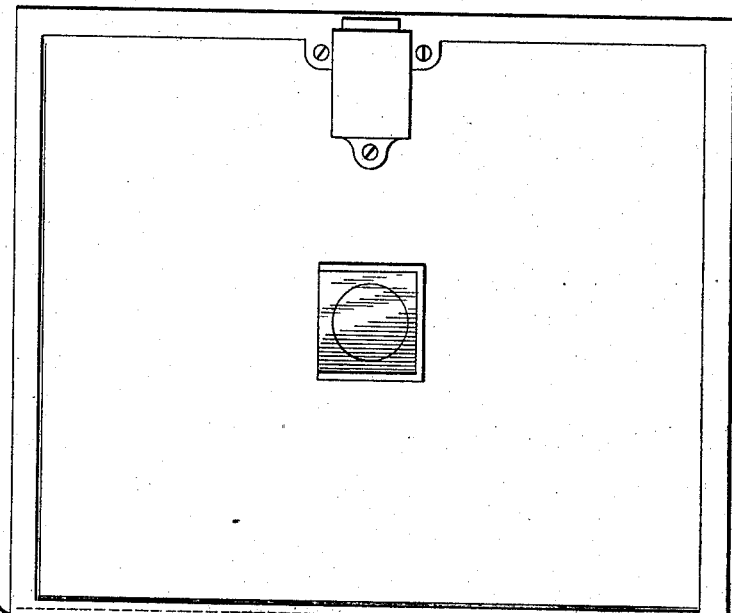
Figure 1:
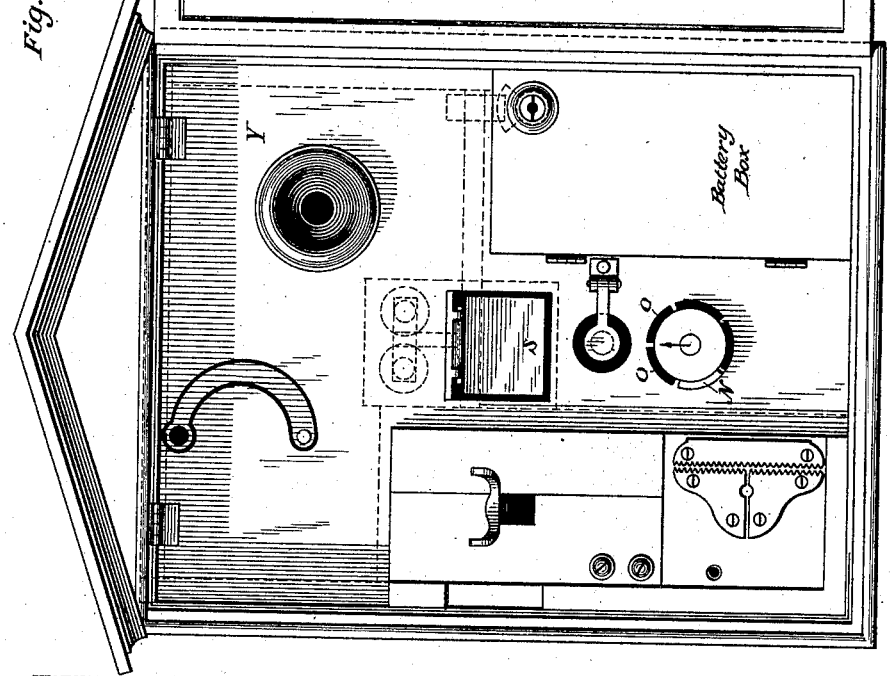
Figure 2:
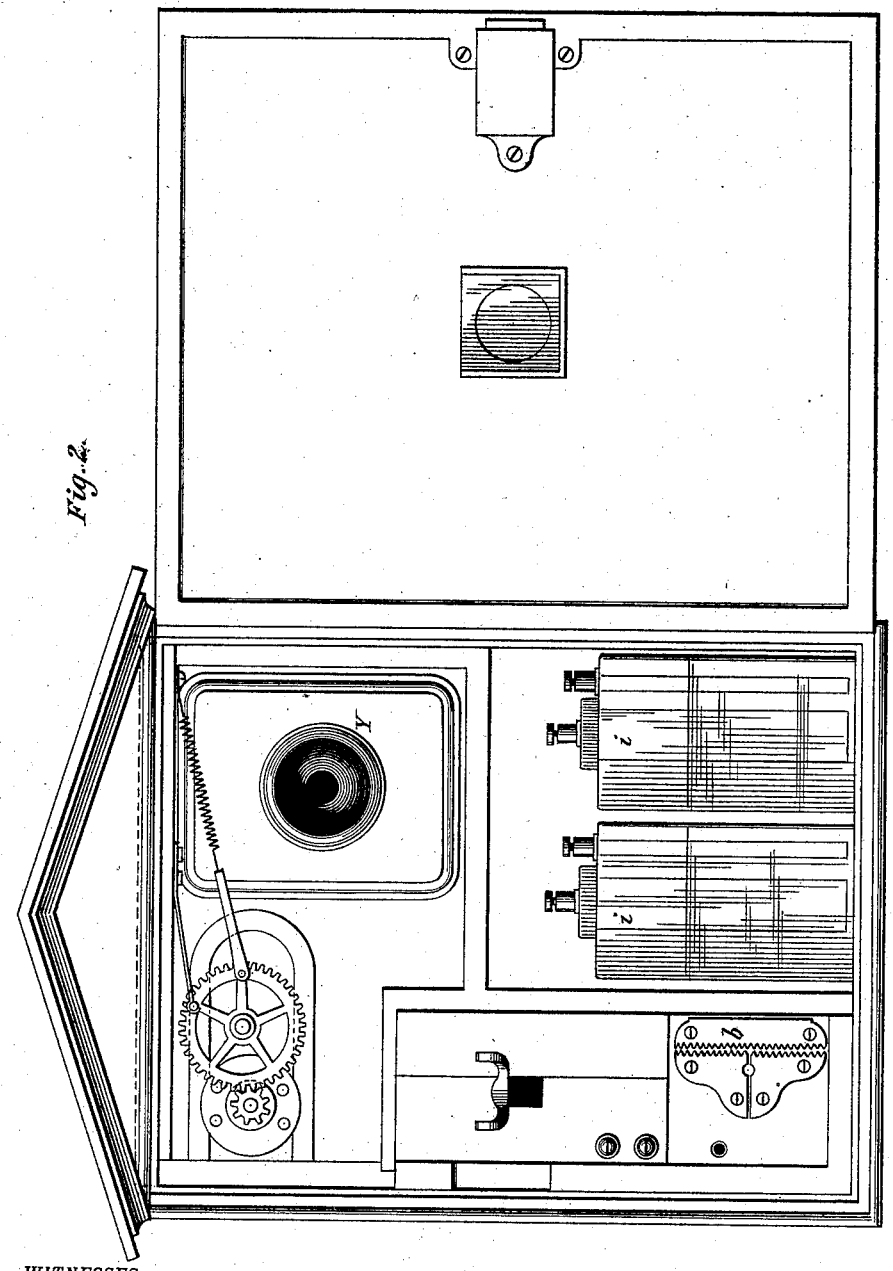

Figure 1 is a front view of one of the boxes located at the several posts. The door is shown open. Parts are shown in dotted lines to indicate that they are located behind a frame or support or secondary door hinged at the top to the box. Fig. 2 is a view of the same box, the said secondary cover being entirely removed to exhibit the elements inside. Figs. 3, 4, 5, and 6 are diagrammatical representations of the elements of the system, showing especially the electric circuits and connections. Fig. 7 is a ground or bird's-eye view of the police-headquarters, police-station, and posts, the same being connected electrically. Fig. 8 is a front elevation of some of the posts or policemen's boxes in electrical connection and electrically connected to a police-station.

Referring particularly to Figs. 3, 4, 5, and 6, there is a police or sub station containing apparatus shown in Figs. 4, 5, and 6 and the lower part of Fig. 3, and any number (two are shown in the drawings) of posts or police-boxes A and B. (Shown in Fig. 3.) The system consists of the combination of a magneto-electric bell, C, having crank D and earth-connection E, an electrical indicator in circuit with said magneto-bell, and consisting of a magnet, F, a notched wheel, G, normally tending to rotate under the influence of a weight, H, suspended from a cord wound upon its shaft I, and a pivoted armature, J, normally pressing in the notches of said wheel, the pressure being produced by the spring K, and being adjacent to said magnet, a plug, L, in circuit with said indicator, a spring-jack, M, for receiving said plug, and a circuit passing from said plug through said spring-jack to an indicator in the first post, said indicator being identical to the first-described indicator at the police-station, except that one of the projections, N, on the notched wheels G' is of metal or conducting material, while the rest, O, are of insulating material, and that there are two terminals, P and Q, normally open and pressing upon the notched wheel. The circuit then passes through a similar indicator at the next post, and then to ground at E'. The said terminals P and Q and P' and Q' are in branch circuits R and R', respectively, and normally open. Each includes any suitable annunciator, S. At each post are a switch and telephonic apparatus adapted to be thrown into the main circuit T by the switch, consisting of the combination of two terminals, U and V, in the main circuit, two terminals, W and X, in circuit with the telephonic apparatus Y, and a conducting-plug, Z, rigidly and mechanically connected with, but electrically insulated from, said latter terminals, and normally electrically in contact with the former terminals.

Fig. 5 shows the telephonic apparatus at the police-station. It is electrically connected to the plug L', which is adapted to be inserted in the spring-jack M. When the terminals W and Z and W and V are in contact, and the plug L' is forced into the spring-jack M, telephonic communication is established between the police-station and the post at which the said terminals are brought in contact. The indicators all have hands or pointers a, which remain in permanent positions, and each of the notched wheels have the same number of projections and as many projections as there are posts. That wheel G at the police-station has no electrical connections, so that all the projections may be of insulating or conducting substances; but in order to operate properly, each of the wheels G' and G² at the posts has one of the projections of metal, and, further, these metal projections are one ahead of the other in the successive posts. Thus, as shown, the projection N is one space ahead of the projection N'.

*b* is a lightning-arrester of usual construction.

Referring more particularly to Figs. 1 and 2, which are different views of the box at any policeman's station, many of the parts in Fig. 3 are repeated herein, as may be observed by noticing the characters of reference, which represent like parts in every instance. Additionally, the mechanism for generating the current in the telephonic apparatus is shown, but not fully described, in this application, as it has no necessary operation with the invention at present in hand.

Referring particularly to Figs. 7 and 8, the parts are named mostly upon the drawings as "headquarters," "trunk-wires," "police-stations," and "posts" 1, 2, 3, 4, 5 upon circuits E, passing out from the various police-stations.

*t* is a portional sectional view of a building adapted to contain the instruments of any police-station, and *g* are outside views of some of the police-boxes mounted upon post *h*.

The *modus operandi* between the police-station and a post—say post B—is given below. If the operator at the police-station desires to notify the policeman at post B that he is wanted, he picks up plug L and inserts it into the spring-jack M. He then sends an electrical impulse over the line by turning the crank D of the magneto-bell C. The momentary current of electricity energizes the magnets F, F', and F², which raise the armatures J, J', and J², which in turn allow the wheel to rotate until the armatures fall into notches numbered in each unity or 1. The same operation is repeated, except that while the armatures are passing along the projections—i. e., are between the notches—a second pulsation or momentary current is transmitted over the line by the same means mentioned above. The terminals P' thus become electrically closed by the projections N', allowing the current to pass through the annunciator S', which operates in the well-known manner. The policeman at post B thus becomes aware that he is wanted. The annunciator S did not operate during the first operation, because no pulsation of current was transmitted while the projection N was passing along in contact with the armature J', but only while the said lever was being lifted from the notch directly adjacent to the projection N. When the annunciator S' has operated, the said operator sends pulsations over the line until the wheels are again brought into their normal position shown in the drawings. It is impossible, as is evident from the construction, to operate more than one of the annunciators simultaneously. Further, an annunciator at any post is operated to signal a policeman only when an electric impulse is transmitted while the armatures are between the notches. Further, the operator becomes aware of what post he is calling, because his indicator acts synchronously with the indicators at the several posts. After the policeman has become aware that he is called and has set his annunciator, by hand or in any suitable manner, he makes telephonic communication with the police-station by bringing the terminals X' and U' together, and also terminals W' and Z' together. The policeman and operator hold conversation, the latter previously inserting plug L' in spring-jack M.

It should be understood that we do not confine ourselves to the exact construction hereinbefore set forth, but that we are entitled to all the devices whose nature conforms to that of the particular means set forth.

Having now stated the object of the said invention, having described its practical realization by reference to the accompanying drawings, and having particularly ascertained the manner in which the same operates to accomplish the said object, what we claim is—

1. In a police-telephone system, a police-station, and police-boxes, the latter being provided with electric indicators each consisting of a wheel having projections and notches upon its periphery, a magnet and its armature, the latter pressing in one of said notches, and all of the projections being of insulating material except one, which is of conducting material, and a weight or similar operating device geared to said wheel, and the former being provided with a synchronously-operating electric indicator which is in circuit with all the said magnets in said posts, the posts being provided also with annunciators located in shunt-circuits to said magnets, and the said projections of conducting material being one space or projection ahead or in advance of each other on the notched wheels of the successive post-indicators, and all indicators having suitable index-hands, as and for the purpose described.

2. In a police-telephone system, the combination of a police-station provided with an electrical indicator consisting of a notched wheel, an index-hand for said notches, mechanism normally tending to rotate said wheel, electric apparatus tending to check said wheel, and consisting of a magnet and its armature, the latter resting in one of the notches in said wheel, the said station being also provided with a magneto-call-bell, and posts or police-boxes in circuit with said electric mechanism and with said magneto-bell, and provided with indicators in all respects like the above-mentioned indicator except that one of the projections between the notches is of conducting material while the remaining similar projections are of insulating material, that the conducting projections are one in advance in the successive posts, and that there are two terminals of an electric circuit, which includes an electric annunciator located in a shunt to that circuit which passes through said police-station and said posts, substantially as described.

Witness our signatures and seals this 31st day of July, 1886.

WILLIAM H. ECKERT. [L. S.]
JOHN A. SEELY. [L. S.]

Witnesses:
AVERY P. ECKERT,
EDWARD P. THOMPSON.